Inventors
William C. Taylor
Gerald R. Grapius
Dominik & Stein
Attorneys

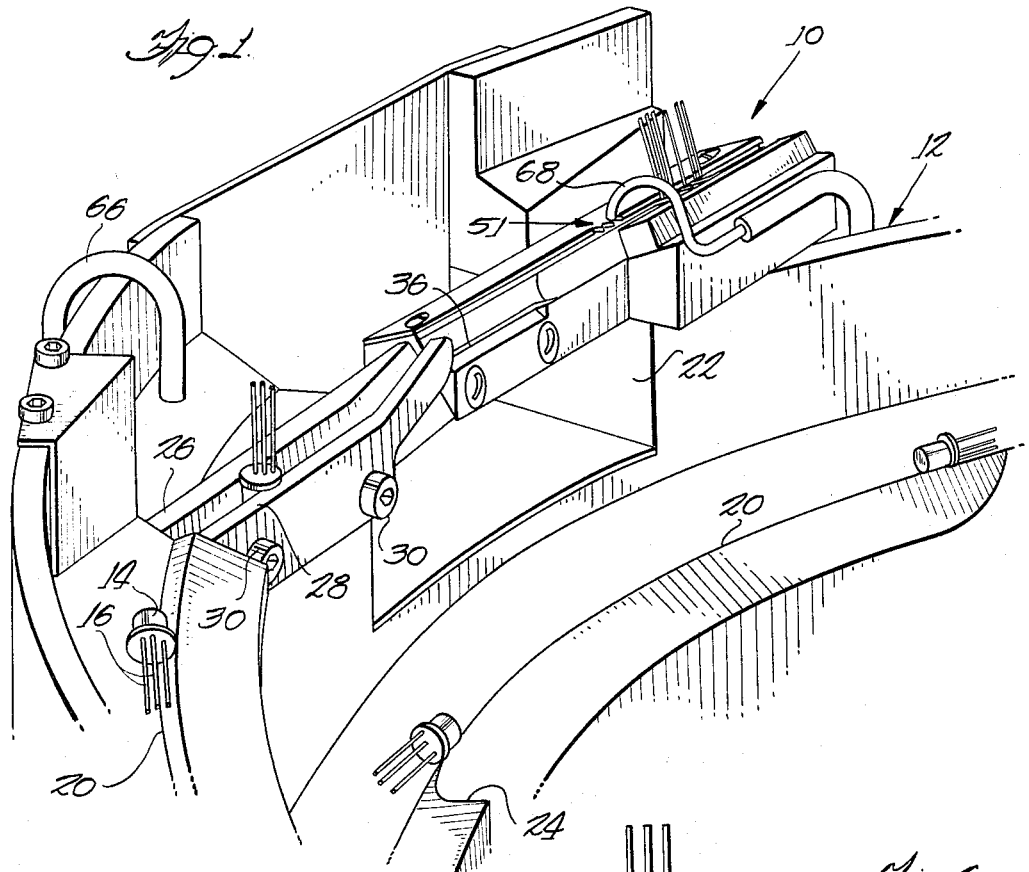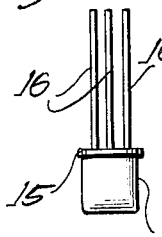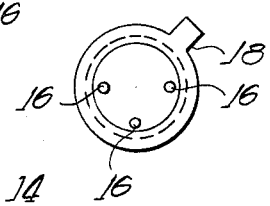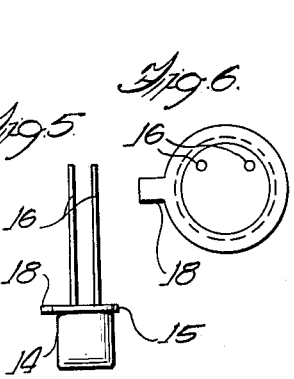

Nov. 29, 1966   W. C. TAYLOR ET AL   3,288,267
METHOD AND APPARATUS FOR ALIGNING
AND ORIENTING COMPONENTS
Filed March 12, 1965   4 Sheets-Sheet 3
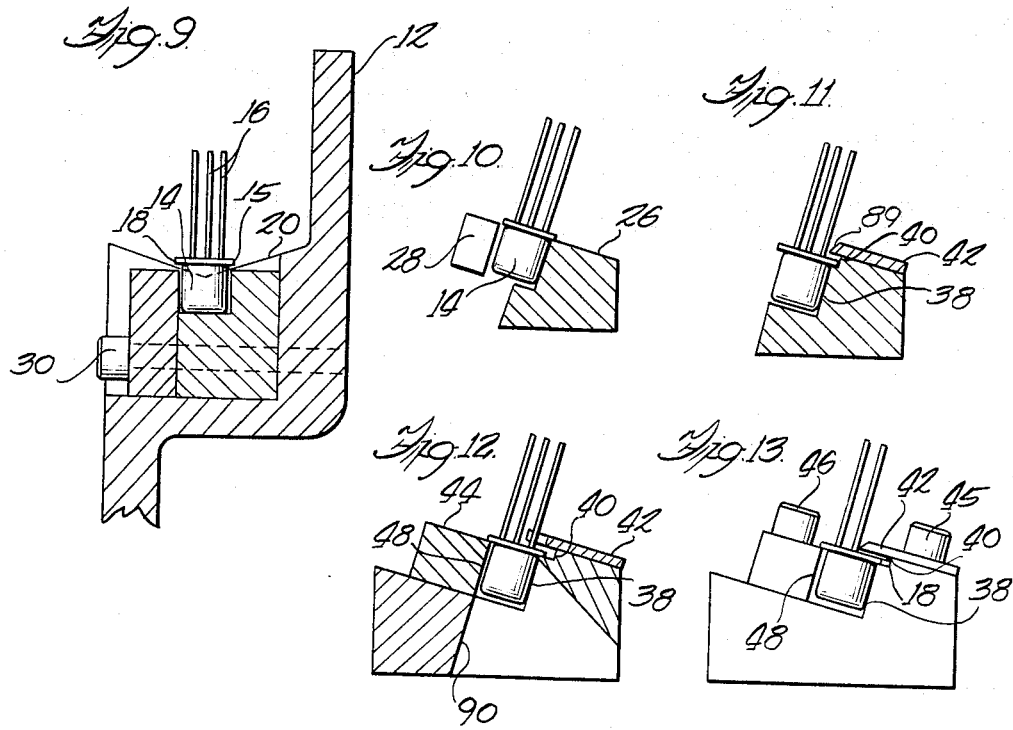
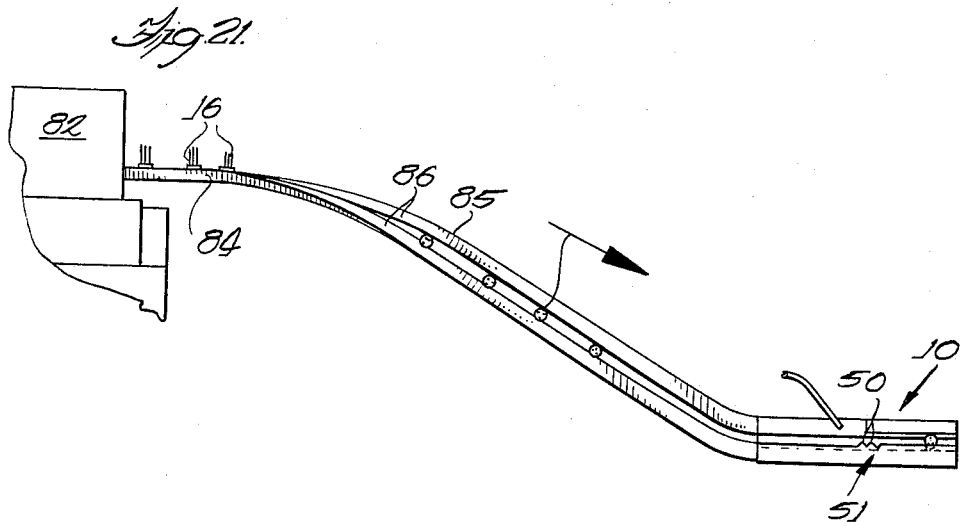
Inventors
William C. Taylor
Gerald R. Grappius
Dominik & Stein
Attorneys

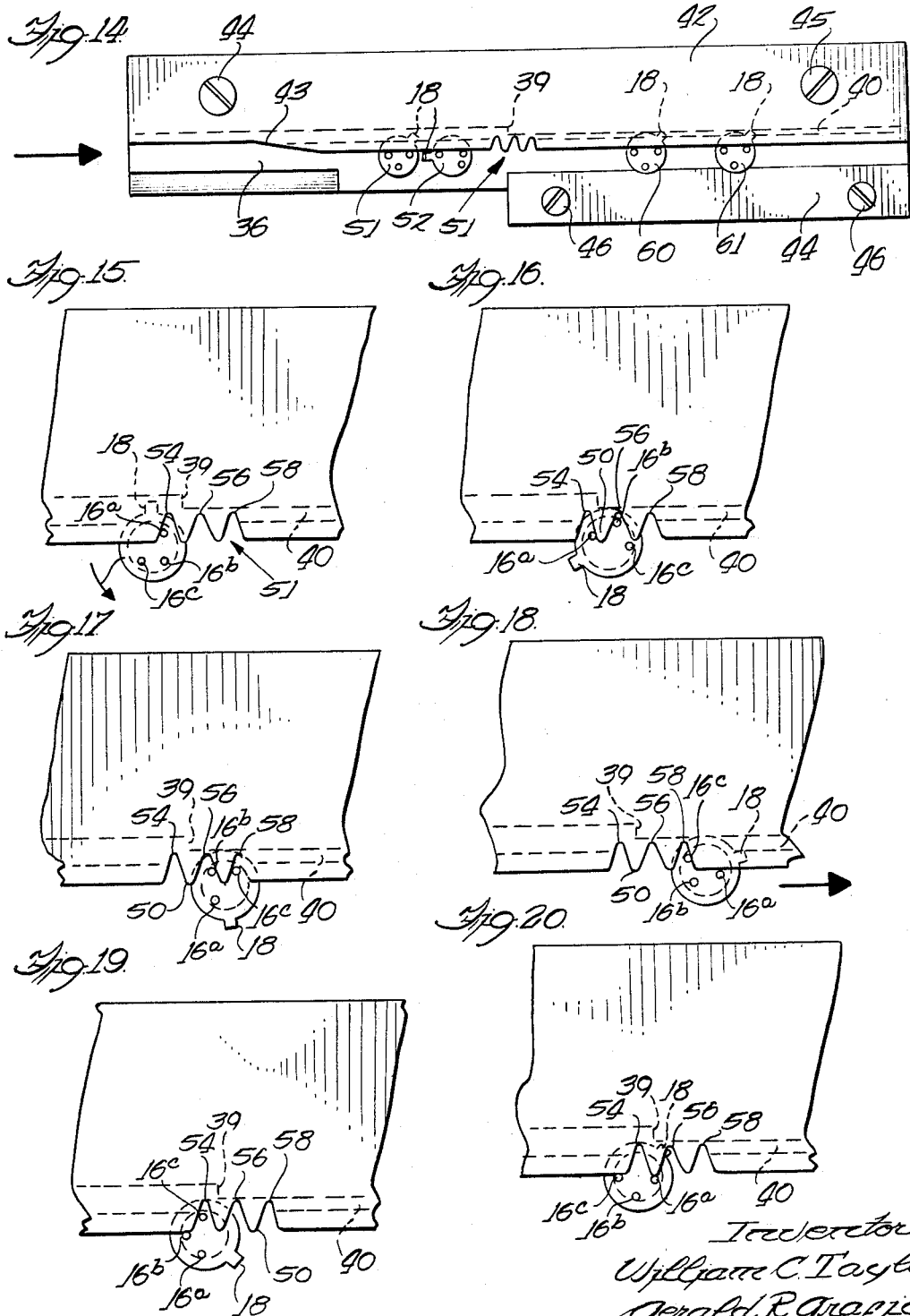

United States Patent Office 3,288,267
Patented Nov. 29, 1966

3,288,267
METHOD AND APPARATUS FOR ALIGNING
AND ORIENTING COMPONENTS
William C. Taylor, Waterford, and Gerald Robert Grafius,
Erie, Pa., assignors to Automation Devices, Inc., Erie,
Pa., a corporation of Pennsylvania
Filed Mar. 12, 1965, Ser. No. 439,368
11 Claims. (Cl. 198—33)

This invention relates to a method and apparatus for feeding and for orienting in a predetermined fashion parts which are received in a random fashion.

The method and apparatus of the present invention are particularly applicable for feeding and for orienting in a predetermined fashion electronic components having a body portion with leads, or terminals, extending therefrom. Transistors are typically of this construction and, as will be apparent from the description which follows, the method and apparatus of the invention are particularly applicable for feeding and orienting them, as well as similar types of component.

In the past, numerous methods and different types of apparatus have been devised for feeding components of the above described type, particularly transistors. These prior methods and apparatus, however, are only operable to feed the components and are not capable of consistently orienting them in a predetermined fashion. The apparatus used is also of complex construction and expensive to manufacture and to maintain. In addition, the orienting means are limited in application to one particular type of feeder apparatus, such as a vibratory bowl feeder or a track section, hence they are not versatile and adaptable in application.

It is therefore an object of the present invention to provide an improved method and apparatus for feeding and for orienting in a predetermined fashion components having a body portion with leads, or terminals, extending therefrom, said components being received in mass and in random alignment.

It is another object of the present invention to provide apparatus of the above described type which is easily modified to handle components which have a different number of leads, or terminals, and which have the leads oriented in various configurations.

It is still another object of the present invention to provide apparatus for aligning and orienting parts of the above described type which is adaptable to various types of component handling systems. In this respect, it is further contemplated that the apparatus be of relatively simple construction, inexpensive to manufacture and to maintain.

It is still another object to provide apparatus for aligning and orienting in a predetermined consistent fashion components having leads which are adaptable to parts handling system of the gravity feed type, a combination of gravity feed and vibration type, or vibratory parts feeders of either the circular or in-line type, as well as other similar types of systems or conveying means.

It is still another object to provide a parts handling system having apparatus for aligning and orienting in a predetermined consistent fashion components having leads and further including apparatus for increasing the rate of feed of said system.

Other objects of the invention will in part be obvious and will in part appear hereinafter.

The above outlined objectives are accomplished by means of aligning and orienting apparatus which, according to the present invention, generally includes a pair of rails spaced apart so as to receive the body portion of the components between them, with the terminals extending either upwardly or downwardly, and adapted to discharge components which are not so aligned after they have traversed along the rails a predetermined distance. The rails leads the components to a comb area having a predetermined number of teeth and the components are caused to rotate by these teeth until an offset projection thereon is in a predetermined position, at which time they are fed through a confined passageway to the discharge end of the apparatus.

The aligning and orienting apparatus is adaptable to virtually any type of parts handling system which is capable of feeding the components to it in a consistent fashion. In the disclosed embodiments, the apparatus is illustrated in operative relationship with a vibratory bowl feeder system and a gravity feed system, but it is apparent from the description that it is easily adapted to many other types of systems.

Also, in the disclosed embodiment, it is illustrated how air jets can be used to increase the productive rate of feed of the system.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIGURE 1 is a top, partial perspective view of a vibratory feeder bowl having aligning and orienting apparatus exemplary of the present invention adapted thereto;

FIGURES 2–6 are various top and side views of several of the different types of components which can be aligned and oriented with the apparatus of the present invention;

FIGURE 9 is a sectional view taken along line 9—9 of FIG. 8;

FIGURE 10 is a sectional view taken along line 10—10 of FIG. 8;

FIGURE 11 is a sectional view taken along line 11—11 of FIG. 8;

FIGURE 12 is a sectional view taken along line 12—12 of FIG. 8;

FIGURE 13 is a sectional view taken along line 13—13 of FIG. 8;

FIGURES 14–20 are top plan views of the aligning and orienting apparatus, illustrating the manner in which the components are oriented; and FIGURE 21 is a view illustrating how the aligning and orienting apparatus is adapted to a gravity feed system.

Similar reference characters refer to similar parts throughout the several views of the drawings.

Figure 7:
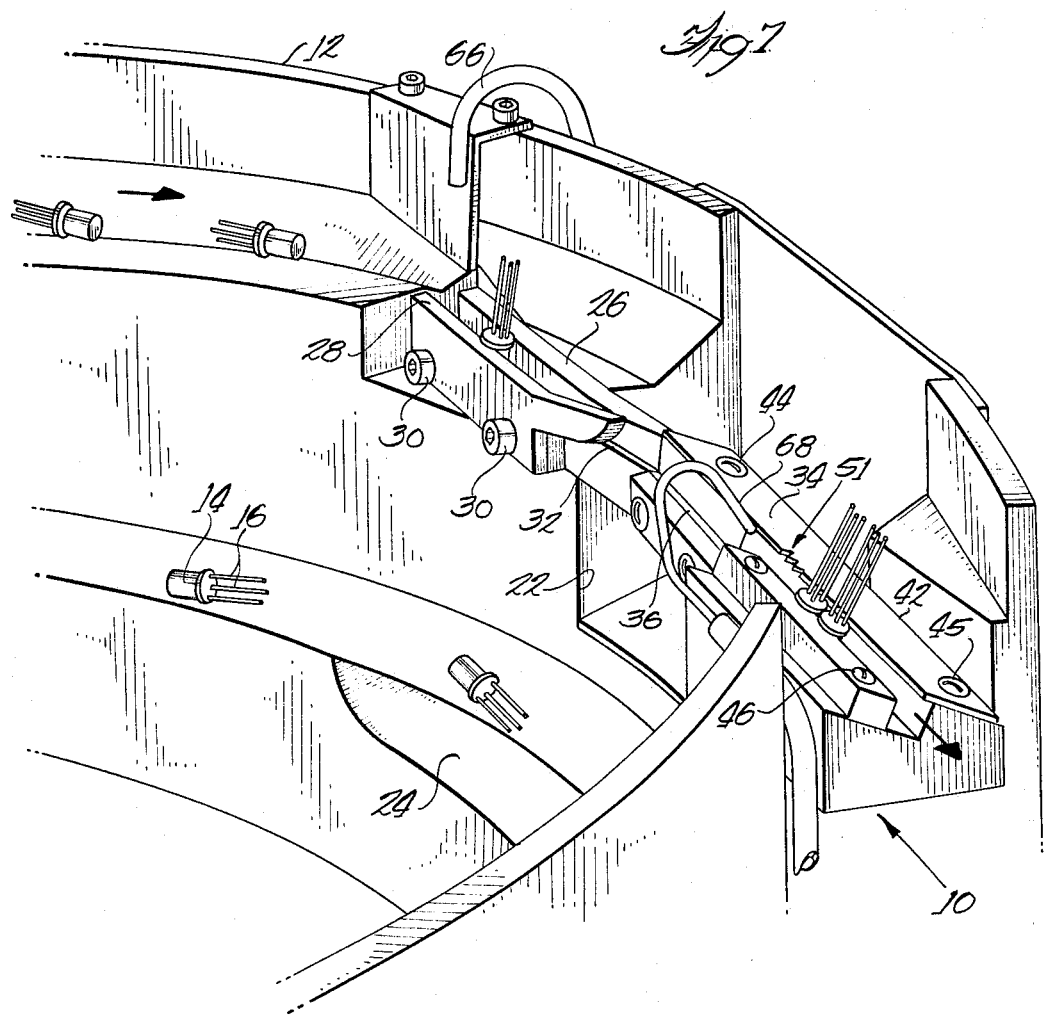
FIGURE 7 is another top, partial perspective view of the apparatus of FIG. 1.

Referring now to the drawings, aligning and orienting apparatus which is exemplary of the present invention is generally indicated with the reference numeral 10 and is shown adapted to a vibratory bowl feeder 12 of the type generally well known in the art. The aligning and orienting apparatus 10, as will be explained more fully hereinafter, is particularly adapted for aligning and orienting components, such as the transistors and the like shown in FIGS. 2–6, which have a body portion 14 with leads, or terminals 16, extending therefrom, an enlarged rim 15 and an off-set projection 18 which has a finite relation between its location and the position of the leads 16. The length of the leads 16 is immaterial as far as the operation of the aligning and orienting apparauts and the overall dimensions of the body portion 14 is critical only to the extent that the apparatus 10 must be correspondingly scaled to handle the particular component. Scaling of the aparatus 10 to handle a particular component is easily accomplished, as will be apparent from the description hereinafter.

The vibratory feeder bowl 12 has a spiral track 20 formed about its periphery and components which are dumped in mass and in random alignment into the bowl are caused to travel up the spiral track 20 due to the vibratory action of the feeder 12. The operation, in this respect, is well known in the art of vibratory feeder bowls.

The spiral track 20 is preferably V-shaped having an angle of approximately 120° so that the components have a tendency to align themselves in an end-to-end attitude as they are "walked" up the track 20. At some point along the track, preferably at or beyond a pocket area 22, the track width is narrowed, as at 24, to retain a relatively single line of components. This construction is not essential to the operation of the aligning and orienting apparatus 10 but it will help obtain higher rates of feed.

As the components reach the end of the track 20, they are spilled onto a pair of rails 26 and 28 which may be adjustably spaced by means of screws 30 so that the enlarged rim 15 of the components will ride on the rails 26 and 28, with the leads 10 either projecting upwardly, as shown in FIG. 1, or downwardly between the rails 26 and 28. At this point, most of the components will assume a radius to radius attitude with the leads 16 projecting either upwardly or downwardly but they are not radially oriented.

The ends of the rails 26 and 28 are bent outwardly toward the periphery of the bowl 12 so that the axis of the components are rotated through an angle of approximately 35°. With this orientation, the axis of the components intersect a plane through the center line of the components, this plane being parallel to the direction of component feed, at a point below the horizontal plane in which the component is positioned.

Along this area of the rails 26 and 28, the outer rail 26 is provided with a shelf or ledge 32 (which may be best seen in FIG. 8) and the end of the rail 26 is butted against a substantially rectangular shaped member 34 which is similarly provided with a ledge or shelf 36 which is positioned with respect to the shelf 32 such that components can ride in a continuous fashion along the shelf 32 to the shelf 36. The components, due to being rotated through an angle of approximately 35°, will rest on the shelf 32 on the rail 26 as they are moved forward by the action of the feeder. The rail 28 is terminated and any component not in such a position will therefore fall off the shelf 32, either toward the center of the bowl or over the rail 26 toward the outside of the bowl into the pocket area for return to the bottom of the bowl. The components which are oriented with the leads 16 projecting downwardly are likewise rejected at this point since they are not properly balanced and will not rest on the shelf 32.

By the time the components are resting on the shelf 36 of the rectangular shaped member 34 they are aligned in a consistent fashion, radius to radius with the leads 16 projecting upwardly, but they are not radially oriented. The components could be confined at this point for such applications as ink marking, lead length trimming, and the like, however, it is apparent that the components could not be presented to other apparatus in any consistent fashion, as far as radial orientation is concerned. The apparatus 10 of the present invention in addition to aligning the components in the above described fashion also radially orients the components in a consistent fashion, in the manner hereinafter described.

The shelf 36 of the rectangular shaped member 34 is angled outwardly towards the periphery of the bowl in the same fashion as the shelf 32, and the components are advanced along the shelf 36 by the vibratory action of the bowl, toward a comb area 51 which is described in detail below. Before reaching the comb area 51, the components are not confined and are free to rotate so that the offset projections 18 do not have any particular orientation. The side wall 38 of the rectangular shaped member 34 is provided with a recessed groove 40 which is at a height above the shelf 36 substantially equal to the height of the body portion 14 from its bottom to the underside of the enlarged rim 15 so that the components can ride on the shelf 36 with the rim 15 and the offset projection 18 in the groove 40. A cover plate 42 substantially the size of the rectangular shaped member 34 is secured to the top of the member 34 by means of fastening means 45 and is positioned such that its one edge extends over the groove 40 formed in the side wall 38, as may be best seen in FIG. 11. A second rectangular shaped member 44 which has a length approximately equal to one-half the length of the rectangular shaped member 34 is secured by means of fastening means 46 in spaced relationship to the rectangular shaped member 34 such that the components are confined, but are able to freely flow, within the confined space between the side wall 38 of the member 42 and a side wall 48 of the member 44. The comb area 51 is defined by a number of teeth formed in the over lying edge of the cover plate 42 in a position substantially adjacent the end of the rectangular shaped member 44. The components are oriented in a consistent fashion by means of the teeth 50, in the manner described below.

Referring now to FIGS. 14–20, the components are advanced towards the comb area 51, while resting on the shelf 36. The components while being uniformily aligned in a radius to radius attitude, with the leads 16 projecting upwardly, are randomly aligned radially, the offset projections 18 thereof extending in different directions, as represented by the components 51 and 52. The direction of feed in FIGS. 14–20 is from left to right.

As the component advances to the teeth 50, the vibratory action of the feeder bowl tends to cause the components to rotate and even though they are free to rotate 360° in practice it is found that they generally orient themselves so that the offset projections 18 are engaged with the back wall of the groove 40, with the offset projections in either a leading or a trailing position. Upon advancing to the teeth 50, one of the leads 16, in FIG. 15 lead 16a, will enter the root 54, unless the component is already properly oriented, as hereinafter described. Lead 16a being engaged in the root 54 stops the forward movement of the component and, in order for the component to advance, it must rotate in a counter-clockwise direction. The counter-clockwise rotation and the forward motion of the component will present the next lead 16b to the root 56 between the two teeth 50, much as a gear would roll along a rack, as shown in FIG. 16. The process is repeated for the lead 16c, the counter-clockwise rotation and forward motion presenting the lead 16c to the root 58. The forward motion of the component is again stopped due to lead 16c being engaged in root 58 and the component is forced to rotate counter-clockwise, until the lead 16a engages the edge of the cover plate 42. At this point, the component is free to rotate until the lead 16c is free of the root 58 and it is then prevented from further rotation by the pivotal action of the lead 16c urging the body portion 14 of the component against the side wall 48 of the rectangular member 44. In other words, the spacing between the side wall 48 and the edge of the cover plate 42 is such that when the leads are oriented as shown to the right in FIG. 14, the components cannot rotate. A modification of this arrangement would be to provide the groove 40 with a depth such that the offset projections 18 of the components would engage the back wall of the groove to prevent the component from further rotating, before the lead engages the edge of the cover plate 42. The process is substantially the same for each component so that they are each oriented with the offset projection 18 leading, as illustrated with components 60 and 61, in FIG. 14.

It may be noted that the comb area 51 has three roots defined by the teeth 50 and that the components have three leads which respectively engage one of the three roots to rotate the components until the offset projections 18 are in a leading position and the lead 16a is engaged with the edge of the cover plate 42, or the offset projections 18 are engaged with the back wall of the groove 40. Since there are three roots defined by the teeth 50, it is important that the lead 16a enter the first root so that leads 16b and 16c enter the second and third roots, respectively, otherwise the component would not be rotated to the same angular, or radial, position each time. It is apparent, however, that it is extremely difficult, if not impossible, to assure that lead 16a enters the first root each time, hence other provisions must be made to assure that the offset projection 18 is rotated to the same radial position each time.

The solution to this problem and the principle of operation of the present invention is illustrated in FIGS. 19 and 20. In FIG. 19, the component is illustrated as being presented to the comb area 51, with the offset projection 18 being positioned in a substantial leading position so that the lead 16c, rather than 16a, will enter the first root. The vibratory action of the feeder bowl will cause the component to advance and the lead 16c will cause it to rotate in a counter-clockwise direction so that lead 16a would be the next lead to enter a root. In accordance with the present invention, however, the groove 40 is provided with a step 39 so that the offset projection 18 engages the back wall of the groove 40, as shown in FIG. 20, before lead 16a, or any other lead, can engage in a root and the component is therefore free to forwardly advance.

It may therefore be seen that regardless of the radial position in which the component is presented to the teeth 50, the component will be forced to rotate in a counter-clockwise direction until the offset projection is in a leading position, as shown in FIG. 14. Additional notches could be provided, but once the offset projection 18 is oriented in a leading position it will engage the back wall of the groove 40 if any of the other leads try to enter a root and prevent the component from rotating further. The success of the operation of the apparatus 10 is therefore dependent upon orienting the offset projection in a leading position, so that the offset projection will prevent any other leads 16 from entering a root once the component is properly oriented, with the offset projection leading and the leads engaged with the edge of the cover plate 42, as shown in FIG. 14, or with the offset projection 18 leading and engaged with the back wall of the groove 40, as described.

In the above description, the component is said to rotate in a counter-clockwise direction. It is not impossible for the component to rotate clockwise before it reaches the comb area 51, however, and in practice it is found that under some condition, it will rotate clockwise. In such cases, the components will eventually end up with the offset projection 18 engaged with the back wall of the groove 40 and at that time will pass through the comb area 51 since none of the leads can engage the roots of the teeth 50, or the component will eventually be forced to rotate in a counter-clockwise direction and in such a case, the action is the same as described above.

The overlying edge of the cover plate 42 may be slightly tapered, as at 43, to pre-orient the components to some degree. The tapered edge engages the leads 16 of the components, holds the component away from the side wall 38 and tends to rotate the component so that two leads will lie in the same plane, as shown in FIG. 14.

The direction of feed within the feeder bowl 12 is immaterial to the operation of the aligning and orienting apparatus 10. The components can be fed in either a clockwise or counter-clockwise direction and the apparatus 10 is merely correspondingly adapted to the feeder bowl. Also, the components can be rotated about its axis in a direction opposite to that described above so that the intersection of the centerline axis of the components intersect the plane through the centerline of the feeder bowl 12 at a point above the plane in which the component is positioned, rather than below it, as previously described. In such a case, the outer rail 26 is terminated and the shelf 36 described above would be provided on the inner rail 28. This arrangement is just as operable as the above described arrangement, but would not be as desirable from the standpoint that most of the parts which are properly aligned would be rejected into the pocket area 22.

Figure 8:
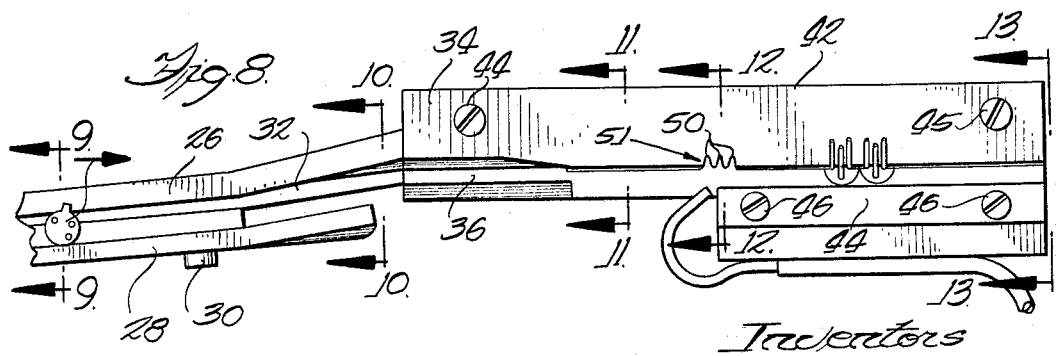
FIGURE 8 is a top plan view of aligning and orienting apparatus exemplary of the present invention.

In FIGS. 1, 7 and 8 there are shown two feed lines 66 and 68 for supplying air jets which blow vertically downward on the components as they fall onto the rails 26 and 28 to assist the components in hanging on them and which blow horizontally against the components to force them into the teeth 50, respectively. These air jets are not essential to the operation of the bowl 12 or the apparatus 10, but they can be advantageously used to increase the productivity of the feeder bowl, that is, the aligning and orienting apparatus 10.

The aligning and orienting apparatus 10 must allow the components to flow freely through it, such as by the effect of gravity, a combination of gravity and vibration, the action of a vibratory parts feeder, either circular, as described above, or in line, or any other means which will allow and cause the components free and unimpeded flow to the apparatus 10. In FIG. 21, there is shown a simple means for conveying components to the aligning and orienting apparatus 10 to illustrate its versatility and to illustrate how it functions in conjunction with a gravity feed system. The means shown includes a supply 82 which feeds the components to a pair of rails 84 and 85 which are twisted so as to deliver the components to the apparatus 10 with the leads 16 projecting horizontally, rather than vertical as described above. The rails 84 and 85 each has a cover plate 86 or the like for retaining the components therebetween, while they roll down the rails to the apparatus 10. The apparatus 10, in this case, is likewise extended vertically, rather than horizontal, and the rectangular member 44 is lengthened to connect to the end of the rail 85. The components are confined and are caused to roll through the comb area 51. In doing so, the components are properly oriented by the leads 16 engaging the teeth 50.

An air jet 90, or some other motivating device, is advantageously provided to assist in conveying or propelling the components from the device 10 after they have been oriented. It is also apparent that the device 10 could be included in the sloped, or angular, portion of the track so that upon being oriented they would continue then travel through it. The air pet 90 could be eliminated, in such an application.

To illustrate how components having less than three leads are oriented, in FIG. 6 the component is the same as the component shown in FIGS. 2 and 3, only the first lead counterclockwise from the offset projection 18 has been eliminated. With components of this type, one of the crest and root combinations of the teeth 50, as shown in FIG. 8, can be eliminated. Also, the dimensions of the plate 42 are changed so that the component is confined and the two leads engaged against the edge of the plate 42 after leaving the comb area 51. With this arrangement, the components are fed with the offset projection 18 positioned 45° clockwise from its finally oriented position shown in FIG. 14.

If the two diametrically opposed leads are retained as they are shown in FIG. 2 and the other lead replaced with 2 leads equally spaced between themselves and the two diametrically opposed leads so that with the offset projection 18 at 0° position the leads are angularly positioned at 45°, 105°, 165° and 225°, respectively, 4 crests and 4 roots would be required to rotate the component to orient it, with the offset projection in the same position as shown in FIG. 14.

If the position of the offset projection 18 is moved 90° counter-clockwise, the direction of feed in FIGS. 14-20 would be right to left, with the teeth configuration reversed (in each case, the mirror image of the disclosed embodiment), but the final, oriented, component position would again be with the offset projection leading the two diametrically opposed leads which would be in a line parallel to the line of feed.

If the offset projection 18 is 90° clockwise from where it is shown in FIG. 2, the final component position has the two diametrically opposed leads in a line parallel with the line of feed, but the offset projection 18 is trailing. A component of this type is illustrated and shown oriented as described in FIG. 21.

From the above description of the manner in which different components are aligned and oriented, it may be noted that in designing aligning and orienting apparatus 10 for handling a particular type of component the offset projection 18 must be oriented in such a way that when the component is in the comb area 51 the offset projection will not allow a properly oriented component to rotate in such a direction that the forewardmost lead can enter a root defined by the teeth 50 of the comb area.

The following observations can also be made with respect to the aligning and orienting apparatus 10:

(1) The dimensions of the confined area (between the walls 38 and 48), the spacing of the teeth 50, the degree to which the plate 42 hangs over the confined area are dictated by the component being aligned and oriented;

(2) The number of roots provided by the teeth 50 are equal to the number of leads on the component;

(3) There is a definite dimensional relation between the component configuration, the first tooth in the comb area 51, and the step 39 in the back wall of the groove 40 which limits the rotation of the parts by obstructing the offset projections;

(4) Mechanically a component cannot pass through the comb area 51 regardless of the manner in which it is presented, without being oriented so that it can leave the comb area;

(5) There must be an unequal spacing of the leads at one point only, and that point must have some finite and consistent relation to an offset projection which is at some point of the diameter of the component.

Idealistically, the best method of presenting components to the comb area 51 is one at a time. This is due to the fact that the components, particularly transistors, generally have the leads disfigured or bent so that they interfere with the rotation of the adjacent components. The offset projections may also present some problems if there is too much pressure pushing the components together. In such cases, if difficulty in operation is experienced, an escapement to release one component at a time into the comb area 51 can be used.

Several other modifications can also be provided to assist operation. For example, a relief angle 89 can be formed on the edge of the cover plate 42 to allow components with bent leads to pass through. The confinement of the component can be incorporated with the orientation which will eliminate the step 39 in the back wall of the groove 40. This will assist the rate of feed since any component coming up to the point of confinement and is already oriented can quickly pass into the confined area. On occasion, a component may fall down and to eliminate a block up, a window 90 can be provided to let the component get back into the feeder bowl.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by letters patent is:

1. Apparatus for aligning and orienting parts having a body portion, a plurality of terminal means projecting from said body portion and an offset tab on said body portion in a predetermined fixed relationship with the orientation of said terminal means, said apparatus comprising: means for aligning each of said parts with said terminal means thereof extending in a generally vertical position and for discharging parts which are not so aligned; a pair of rail means defining a path in which said parts are confined and must travel, a plurality of teeth-like notches formed in one of said rail means which project into said path, each of said notches being engageable by individual ones of said plurality of terminal means to cause said parts to rotate, and means engaged by said offset tabs to limit the rotation of said parts and thereby orient said offset tab means in a predetermined radial position before said parts are free to traverse said path to its end.

2. Apparatus, as claimed in claim 1, further including means for forcibly urging said parts into said teeth-like notches.

3. Apparatus, as claimed in claim 2, wherein said means comprises an air jet.

4. Apparatus for aligning and orienting parts having a body portion, a plurality of terminal means projecting from said body portion and an offset tab on said body portion in a predetermined fixed relationship with the orientation of said terminal means, said apparatus comprising: means for aligning each of said parts with said terminal means thereof extending in a generally vertical position and for discharging parts which are not so aligned; a pair of rail means defining a path in which said parts are confined and must travel, a plurality of teeth-like notches formed in one of said rail means which project into said path, each of said notches being engageable by individual ones of said plurality of terminal means to cause said parts to rotate, and means engaged by said offset tabs to limit the rotation of said parts and thereby orient said offset tab means in a predetermined radial position which will not allow a properly oriented part to rotate in such a direction that the forwardmost one of said leads can enter said teeth-like notches, thereby permitting said parts to traverse said path to its end.

5. Apparatus for aligning and orienting parts having a body portion, a plurality of terminal means projecting from said body portion and an offset tab on said body portion in a predetermined fixed relationship with the orientation of said terminal means, said apparatus comprising: a first pair of rail means spaced apart so as to receive the body portions of said parts thereof extending in a generally vertical position, the end portions of said first pair of rail means being angularly displaced so as to rotate the axis of said parts through a predetermined angle, a shelf formed on one of said rail means upon which said parts can rest, means extending said shelf beyond the ends of said first pair of rail means, said means providing a position for rejecting parts not properly aligned; a second pair of rail means defining a path in which said parts are confined and must travel, a plurality of teeth-like notches formed in one of said rail means which project into said path, each of said notches being engageable by individual ones of said plurality of terminal means to cause said parts to rotate, and means engaged by said offset tabs to limit the rotation of said parts and thereby orient said offset tab means in a predetermined radial position before said parts are free to traverse said path to its end.

6. Apparatus for aligning and orienting parts having a body portion, a plurality of terminal means projecting from said body portion and an offset tab on said body portion in a predetermined fixed relationship with the orientation of said terminal means, said apparatus comprising: a first pair of rail means spaced apart so as to receive the body portions of said parts therebetween with the terminal means thereof extending in generally vertical position, the end portions of said first pair of rail means being angularly displaced so as to rotate the axis of said parts through a predetermined angle, a shelf formed on one of said rail means upon which said parts can rest, means extending said shelf beyond the ends of said first pair of rail means, said means providing a position for rejecting parts not properly aligned; a second pair of rail means defining a path in which said parts are confined and must travel, a groove formed in the side wall of one of said second pair of rails, a cover plate secured to one of said second pair of rails having a plurality of teeth-like notches formed in one edge thereof which project into said path, each of said notches being engageable by individual ones of said plurality of terminal means to cause said parts to rotate to orient said offset tab means in a predetermined radial position which will not permit a properly oriented part to rotate in such a direction that the forwardmost one of said leads can enter said teeth-like notches, thereby permitting said parts to traverse said path to its end.

7. Apparatus for aligning and orienting parts having a body portion, a plurality of terminal means projecting from said body portion and an offset tab on said body portion in a predetermined fixed relationship with the orientation of said terminal means, said apparatus comprising: a first pair of rail means spaced apart so as to receive the body portions of said parts therebetween with the terminal means thereof extending in a generally vertical position, the end portions of said first pair of rail means being angularly displaced so as to rotate the axis of said parts through a predetermined angle, a shelf formed on one of said rail means upon which said parts can rest, means extending said shelf beyond the ends of said first pair of rail means, said means providing a position for rejecting parts not properly aligned; a second pair of rail means defining a path in which said parts are confined and must travel, a groove formed in the side wall of one of said second pair of rails, a cover plate secured to one of said second pair of rails having a plurality of teeth-like notches formed in one edge thereof which project into said path, each of said notches being engageable by individual ones of said plurality of terminal means to cause said parts to rotate, a step formed in said groove which limits the rotation of said parts by obstructing said offset tab means to prevent the forwardmost one of said leads from entering said teeth-like notches, thereby permitting said parts to traverse said path to its end.

8. A parts handling system for aligning and orienting parts having a body portion, a plurality of terminal means projecting from said body portion and an offset tab on said body portion in a predetermined fixed relationship with the orientation of said terminal means, said system comprising: a vibratory bowl having an inclined spiral track formed about its interior periphery and adapted to cause said parts to travel up said track to its end; aligning and orienting means positioned at the end of said track including a first pair of rail means spaced apart so as to receive the body portion of said parts therebetween with the terminal means of said parts extending in a generally vertical position, said first pair of rail means being adapted to discharge parts which are not so aligned; a second pair of rail means defining a path in which said parts are confined and must travel, a plurality of teeth-like notches formed in one of said rail means which project into said path, each of said notches being engageable by individual ones of said plurality of terminal means to cause said parts to rotate to orient said offset tab means in a predetermined radial position which will not permit a properly oriented part to rotate in such a direction that the forwardmost one of said leads can enter said teeth-like notches, thereby permitting said parts to traverse said path to its end.

9. A parts handling system for aligning and orienting parts having a body portion, a plurality of terminal means projecting from said body portion and an offset tab on said body portion in a predetermined fixed relationship with the orientation of said terminal means, said system comprising gravity feed means for feeding parts in a consistent fashion; a first pair of rail means coupled to said gravity feed means, said first pair of rail means being spaced apart so as to receive the body portion of said parts therebetween and adapted to convey said parts with said terminal means extending in a generally horizontal position, a second pair of rail means coupled to said first pair of rail beans and arranged to define a vertical path in which said parts are confined and must travel, a plurality of teeth-like notches formed in one of said rail means which project into said path, each of said notches being engageable by individual ones of said plurality of terminal means to cause said parts to rotate, and means engaged by said offset tabs to limit the rotation of said parts and thereby orient said offset tab means in a predetermined radial position which will not permit a properly oriented part to rotate in such a direction that the forwardmost one of said leads can enter said teeth-like notches, thereby permitting said parts to traverse said path to its end.

10. A method for feeding and orienting a plurality of unoriented parts having a body portion, a plurality of terminal means projecting from said body portion and an offset tab on said body portion in a predetermined fixed relationship with the orientation of said terminal means comprising the steps of feeding said parts in a consistent fashion to orienting apparatus with said terminal means thereof all projecting in a predetermined general direction; confining said parts so as to cause said parts to travel along a defined path; engaging said terminal means of said parts with teeth-like means which cause said parts to rotate, engaging said offset tabs thereof with stop means while said parts travel along said defined path to prevent any others of said terminal means from engaging said teeth-like means; and discharging said parts with said offset tabs thereof engaged with said stop means, whereby all of said parts are so oriented.

11. Apparatus for aligning and orienting parts having a body portion, a plurality of terminal means projecting from said body portion and an offset tab on said body portion in a predetermined fixed relationship with the orientation of said terminal means, said parts being fed to said apparatus with said terminal means extending in a generally vertical position, said apparatus comprising: a pair of rail means defining a path in which said parts are confined and must travel, the top wall of one of said pair of rail means being extended to form a ledge which projects into said path and the side wall thereof having a groove formed in it beneath said ledge, a plurality of teeth-like notches formed in one edge of said ledge, each of said notches being engageable by individual ones of said plurality of terminal means to cause said parts to rotate, and a step formed in said groove which limits the rotation of said parts by obstructing said offset tab to prevent the forwardmost one of said leads from entering said teeth-like notches.

References Cited by the Examiner

UNITED STATES PATENTS

| | | | |
|---|---|---|---|
| 2,609,912 | 9/1952 | Engel | 198—33 |
| 3,109,530 | 11/1963 | McPherson | 198—33 |
| 3,147,843 | 9/1964 | Freidenrich | 198—33 |

OTHER REFERENCES

Hopper Feeding, by Philippovic in August 1962 issue of Automatic Machining.

EVON C. BLUNK, *Primary Examiner.*

EDWARD A. SROKA, *Examiner.*